Sept. 21, 1926.  
S. H. CAMPBELL  
1,600,311  
FASTENING FOR AIR BRAKE PRESSURE VALVES  
Filed July 31, 1925
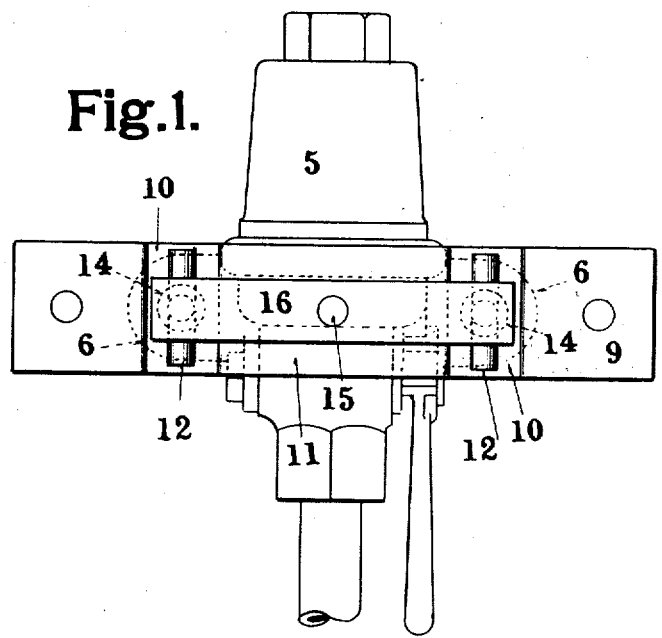
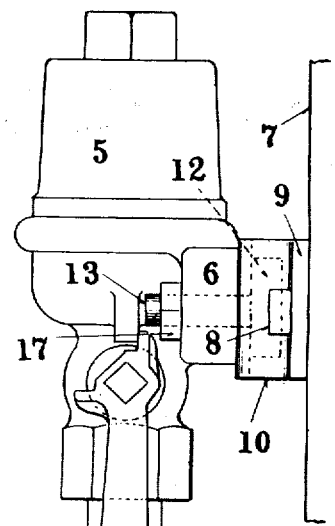
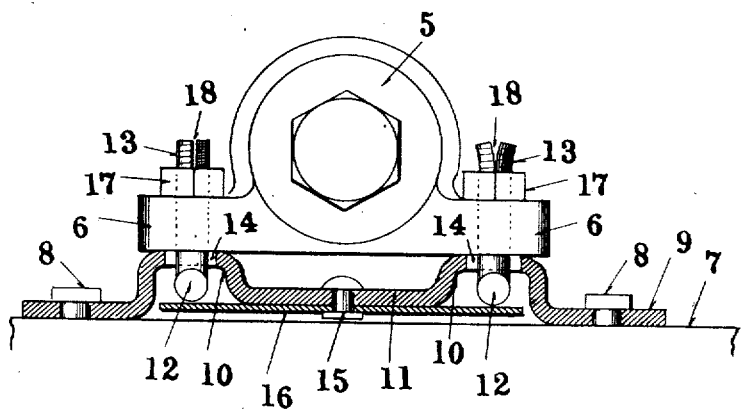
INVENTOR  
S. H. CAMPBELL  
BY E. E. Huffman  
ATTORNEY Patented Sept. 21, 1926.

1,600,311

UNITED STATES PATENT OFFICE.

STERLING H. CAMPBELL, OF ST. LOUIS, MISSOURI, ASSIGNOR TO RAILWAY DEVICES COMPANY, OF ST. LOUIS, MISSOURI, A CORPORATION OF MISSOURI.

FASTENING FOR AIR-BRAKE-PRESSURE VALVES.

Application filed July 31, 1925. Serial No. 47,326.

My invention relates to a fastening for air brake pressure valves, and particularly to such a fastening in the form of a bracket adapted to be secured to the end of a railway car. One of the objects of my invention is to so construct the bracket that it will accommodate itself to hold pressure valves of various styles which have retaining lugs of different width and thickness, and in which the distance between the holes in the lugs also vary.

In the accompanying drawings, which illustrate one form of fastening device made in accordance with my invention, together with a pressure valve carried thereby, Figure 1 is a rear view showing the bracket disconnected from the car; Figure 2 is a side view; and Figure 3 is a top plan view, the bracket being shown in section.

The air brake pressure valve, one form of which is indicated at 5, is provided with retaining lugs 6 having bolt holes formed therein. Secured to the end of the car 7 by means of bolts or rivets 8 is the bracket 9 formed by bending a strap of metal into the shape best shown in Figure 3, so as to provide a pair of projecting portions 10 and an intermediate portion 11 out of contact with the end of the car. The projections 10 form pockets to receive the heads 12 of T-bolts 13 the bodies of which pass through openings 14 in the projections 10. These openings 14 are of considerably greater diameter than the diameter of the bolts 13 so as to accommodate the variation in distance between the holes in the lugs of different types of air brake pressure valves. In order to retain the bolts in position in the holes 13 and prevent their loss during shipment, I secure to the intermediate portion 11 of the bracket, by means of a rivet 15, a retaining strip 16 the ends of which extend over the heads of the bolts. The ends of the bolts are threaded to receive nuts 17 adapted to be screwed down against the lugs 6, and locking means for locking the nuts is provided, such for example as forming slots 18 in the ends of the bolts so that they may be spread, as shown at the right hand side of Figure 3.

It will be evident that my construction provides a simple and effective holding device for air brake pressure valves, which will accommodate valves of various types now in use notwithstanding the variations in the width and thickness of the lugs and the distance between the bolt holes in the lugs. Further, the device constitutes practically a unitary structure, the parts of which are not likely to become separated and lost.

Having fully described my invention, what I claim as new and desire to secure by Letters Patent of the United States is:

1. In a device of the class described, the combination with an air brake retainer valve, of a bracket adapted to be attached to a car, and valve retaining means carried by said bracket, said means engaging with holes in the valve lugs.

2. In a device of the class described, the combination with a bracket adapted to be attached to a car, of valve retaining means carried by said bracket, said means engaging with holes in the valve lugs and being movable in said holes to adapt the device to the distance between the valve lug holes.

3. In a device of the class described, the combination with an air brake retainer valve, of a bracket adapted to be secured to a car, and a pair of bolts carried by said bracket for engaging with the holes in the lugs of a valve.

4. In a device of the class described, the combination with a bracket adapted to be secured to a car, of a pair of bolts carried by said bracket for engaging with the holes in the lugs of a valve, said bolts being movable toward and away from each other to adapt the device to the distance between the valve lug holes.

5. In a device of the class described, the combination with a bracket adapted to be attached to a car, said bracket being provided with pockets, of a pair of bolts having their heads situated in said pockets for engaging with the holes in the lugs of a valve.

6. In a device of the class described, the combination with a bracket adapted to be attached to a car, said bracket being provided with pockets, of a pair of bolts having their heads situated in said pockets for engaging with the holes in the lugs of a valve and retaining means carried by the bracket for engaging with the bolt heads to hold them in position.

7. In a device of the class described, the combination with a bracket adapted to be secured to a car, said bracket being provided with pockets, of a pair of bolts having their heads situated in said pockets for engaging with the holes in the lugs of a valve, said bolts being movable toward and away from each other to adapt the device to the distance between the valve lug holes, and a strip secured to the bracket and projecting over the pockets to retain the bolts in position.

In testimony whereof, I hereunto affix my signature, this 29th day of July, 1925.

STERLING H. CAMPBELL.

combination with a bracket adapted to be secured to a car, said bracket being provided with pockets, of a pair of bolts having their heads situated in said pockets for engaging with the holes in the lugs of a valve, said bolts being movable toward and away from each other to adapt the device to the distance between the valve lug holes, and a strip secured to the bracket and projecting over the pockets to retain the bolts in position.

In testimony whereof, I hereunto affix my signature, this 29th day of July, 1925.

STERLING H. CAMPBELL.

DISCLAIMER.

1,600,311.—*Sterling H. Campbell*, St. Louis, Mo. FASTENING FOR AIR-BRAKE-PRESSURE VALVES. Patent dated September 21, 1926. Disclaimer filed May 4, 1929, by the assignee, *Railway Devices Company*.

Hereby enters this disclaimer to any subject-matter which may be included in claim 1 of the aforesaid patent, except when the "valve retaining means" are so "carried by" the "bracket" as to be permanently retained in association with the bracket independently of any means for securing them to the valve, and would therefore be "carried by" the bracket at all times in transportation and handling, including when the retaining means is not associated with a valve and while the retaining means are being brought into engagement with the holes in the valve lugs; and your petitioner also hereby enters disclaimer to any subject-matter which may be included in claim 3 of the aforesaid patent, except when the "bolts" are so "carried by" the "bracket" as to be permanently retained in association with the bracket independently of any means for securing them to the valve, and would therefore be "carried by" the bracket at all times in transportation and handling, including when the bolts are not associated with a valve and while the bolts are being passed into engagement with the holes in the lugs of a valve.

[*Official Gazette May 21, 1929.*]

DISCLAIMER.

1,600,311.—*Sterling H. Campbell*, St. Louis, Mo. FASTENING FOR AIR-BRAKE-PRESSURE VALVES. Patent dated September 21, 1926. Disclaimer filed May 4, 1929, by the assignee, *Railway Devices Company*.

Hereby enters this disclaimer to any subject-matter which may be included in claim 1 of the aforesaid patent, except when the "valve retaining means" are so "carried by" the "bracket" as to be permanently retained in association with the bracket independently of any means for securing them to the valve, and would therefore be "carried by" the bracket at all times in transportation and handling, including when the retaining means is not associated with a valve and while the retaining means are being brought into engagement with the holes in the valve lugs; and your petitioner also hereby enters disclaimer to any subject-matter which may be included in claim 3 of the aforesaid patent, except when the "bolts" are so "carried by" the "bracket" as to be permanently retained in association with the bracket independently of any means for securing them to the valve, and would therefore be "carried by" the bracket at all times in transportation and handling, including when the bolts are not associated with a valve and while the bolts are being passed into engagement with the holes in the lugs of a valve.

[*Official Gazette May 21, 1929.*]